United States Patent
Kovacevic et al.

(10) Patent No.: US 9,875,002 B2
(45) Date of Patent: Jan. 23, 2018

(54) METHOD AND APPARATUS FOR CONTENT BROWSING AND SELECTION

(71) Applicant: Roku, Inc., Los Gatos, CA (US)

(72) Inventors: Jana Kovacevic, Moutain View, CA (US); Ali M. Vassigh, San Jose, CA (US); Jeffrey Paul Anderson, Cottonwood Heights, UT (US); Vincent Clement Da Silva, Santa Cruz, CA (US)

(73) Assignee: Roku, Inc., Los Gatos, CA (US)

( * ) Notice: Subject to any disclaimer, the term of this patent is extended or adjusted under 35 U.S.C. 154(b) by 0 days.

(21) Appl. No.: 13/778,105

(22) Filed: Feb. 26, 2013

(65) Prior Publication Data
US 2014/0245222 A1    Aug. 28, 2014

(51) Int. Cl.
G06F 17/00        (2006.01)
G06F 3/0484       (2013.01)
G06F 3/0482       (2013.01)

(52) U.S. Cl.
CPC ........ G06F 3/04842 (2013.01); G06F 3/0482 (2013.01)

(58) Field of Classification Search
None
See application file for complete search history.

(56) References Cited

U.S. PATENT DOCUMENTS

| | | | |
|---|---|---|---|
| 2002/0056102 A1* | 5/2002 | Dillon | H04N 7/17345 725/39 |
| 2003/0151621 A1* | 8/2003 | McEvilly | H04N 7/17318 715/744 |
| 2005/0188402 A1* | 8/2005 | de Andrade et al. | 725/46 |
| 2008/0117922 A1* | 5/2008 | Cockrell et al. | 370/401 |
| 2009/0044148 A1* | 2/2009 | Shirota | 715/841 |
| 2010/0070925 A1* | 3/2010 | Einaudi et al. | 715/830 |
| 2010/0251305 A1* | 9/2010 | Kimble et al. | 725/46 |
| 2010/0284671 A1* | 11/2010 | Goodwin et al. | 386/297 |
| 2011/0119621 A1* | 5/2011 | Cho et al. | 715/788 |
| 2012/0011437 A1* | 1/2012 | James et al. | 715/702 |
| 2012/0131624 A1* | 5/2012 | Garner | H04N 21/2353 725/100 |

\* cited by examiner

*Primary Examiner* — Keith Bloomquist
(74) *Attorney, Agent, or Firm* — Sterne, Kessler, Goldstein & Fox P.L.L.C.

(57) ABSTRACT

A method includes displaying a left panel and a central panel, where the left panel is contiguous to the central panel and oriented on a left side of the central panel. A first selection on the left panel is detected. Content is displayed on the central panel responsive to the first selection. A second selection from the content on the central panel is detected. The central panel is displayed together with a right panel responsive to the second selection. The right panel is contiguous with the central panel and oriented on a right side of the central panel. The left panel is removed in response to the second selection. A third selection on the right panel is detected. The left panel displays choices. The central panel includes different content associated with one of the choices. The right panel includes functions for operation on selected content.

20 Claims, 9 Drawing Sheets

METHOD AND APPARATUS FOR CONTENT BROWSING AND SELECTION

FIELD OF INVENTION

The invention generally relates to browsing and selecting content, and more particularly relates to browsing and selecting content in a streaming media environment.

BACKGROUND

Consumers have an increasing amount of on-demand media content available to them. For example, on-demand media content includes visual content (e.g., movies, television shows, still images), audio content (e.g., music), and software applications (e.g., games).

With an increasing amount of on-demand content available, it becomes more challenging to find and select content of interest. Consumers also have an increasing number of choices on where to buy, rent or consume this content. With the increase of available content and content provider choices, it becomes more challenging for the consumer to find the right content from the right content provider. For example, some content is available free for paid subscribed users; other content is available without charge and without a subscription; and yet other content is available for rent or purchase on an individual basis.

Thus, there is a need for improved techniques for evaluating on-demand media content.

SUMMARY

A method includes displaying a left panel and a central panel, where the left panel is contiguous to the central panel and oriented on a left side of the central panel. A first selection on the left panel is detected. Content is displayed on the central panel responsive to the first selection. A second selection from the content on the central panel is detected. The central panel is displayed together with a right panel responsive to the second selection. The right panel is contiguous with the central panel and oriented on a right side of the central panel. The left panel is removed in response to the second selection. A third selection on the right panel is detected. The third selection is an operation. The left panel displays choices. The central panel includes different content associated with one of the choices. The right panel includes functions for operation on selected content.

BRIEF DESCRIPTION OF THE DRAWINGS

The following figures depict various embodiments for illustrative purposes. From the figures and corresponding description, different embodiments may be employed without departing from the invention as described herein.

FIGS. 5A-6B illustrate exemplary screen shots associated with an embodiment of the invention.

DETAILED DESCRIPTION

Figure 1:
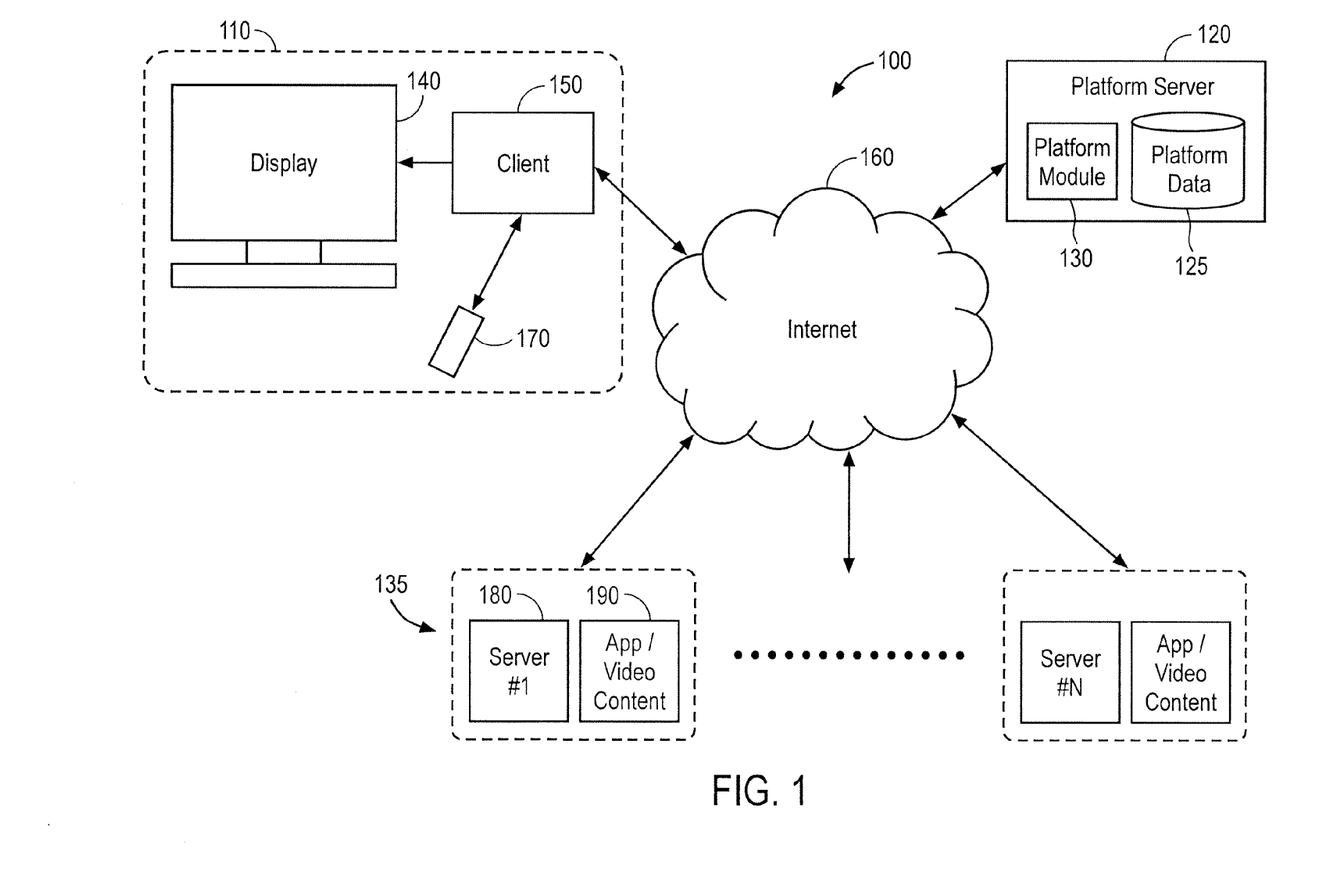
FIG. 1 illustrates a system configured in accordance with an embodiment of the invention.

FIG. 1 illustrates a streaming environment 100. The streaming environment 100 includes an interface system 110, a platform server 120 and one or more sources of content programming 135. In one embodiment, the interface system 110 includes a display device 140 (e.g., monitor or television), a client device 150 (e.g., a streaming media player) and a user input device 170 (e.g., a remote control). The client device 150 is configured to communicate with the display device 140 and a network 160.

In one embodiment, the platform server 120 includes a database 125 of platform data and a platform module 130. The database 125 is configured to store data such as programming software packages. The data within these programming software packages include the network locations and content descriptions of content sources 135, hardware/software capabilities of different firmware versions and specifications of the client device 150, customer data associated with each client device 150 and user interface information associated with the client device 150.

In one embodiment, the customer data includes customer specific information such as demographic data, geographic data, ISP identification and financial information. In one embodiment, the platform server 120 generates customized user interfaces for each of the client devices 150. In one embodiment, the user interface from the platform server 120 provides a selection of content such as audio, visual and gaming content to the client device 150. In this example, the platform server 120 is configured to supply a graphical representation of available content to the client device 150. The client device 150 selects and accesses individual content through this graphical representation.

In one embodiment, the platform server 120 is configured to receive input from client device 150 and processes the input through the platform module 130. The input from the client device 150 includes navigation and selection commands which may represent selection of content, search for content and ongoing interaction with an application running on the platform server 120.

In one embodiment, the client device 150 displays content on display device 140. In one embodiment, the content displayed on the display device is sourced from one of the client device 150, the platform server 120 and the content source 135. In one embodiment, the input device 170 transmits signals to the client device 150. In one embodiment, the input device 170 utilizes one of or a combination of an infrared signal, radio frequency signal and Bluetooth signal to communicate with the client device 150.

The input device 170 is configured to enter data and to make user selections from the interface as presented through the client device 150. In one embodiment, the interface supplied by the client device 150 is based on the platform server 120, from the content sources 135 or locally from the client device 150. In one embodiment, the input device 170 also includes a display to show additional content. In another embodiment, the input device 170 includes a touch screen which allows content to be displayed and input to be received. Exemplary input devices 170 include dedicated remote controls, smart phones, tablets, and mobile computers.

In one embodiment, the content sources 135 include a server 180 and a storage device 190. In one embodiment, the network address of particular content stored within the storage device 190 is maintained within the platform server 120. In another embodiment, the general location of the content source 135 is maintained and stored within the platform server 120 while the specific locations of corresponding content are managed locally by the content source 135. In yet another embodiment, the location of the content source 135 is embedded within the graphical representation displayed through the client device 150 such that interaction with the graphical representation through the client device 150 allows the content located within the content source 135 to be accessible to the client device 150.

In one embodiment, the content stored within the storage device 190 includes music, video, still pictures, text, graphics, gaming applications and the like. In one embodiment, the particular content which is stored within the storage device 190 is provided to the client device 150 through the network 160. In one embodiment, the network 160 is the Internet. In another embodiment, the network 160 is a local area network. In yet another embodiment, the network 160 is a satellite based network or a terrestrial network.

In one embodiment, the client device 150 makes a request for specific content. If the requested content is video content, the storage device 190 transmits video data that represents the specific video content to the client device 150 through the content source 135.

In one embodiment, platform server 120 supports interfaces, such as login interfaces, search interfaces and customized interfaces for the client device 150.

Figure 2:
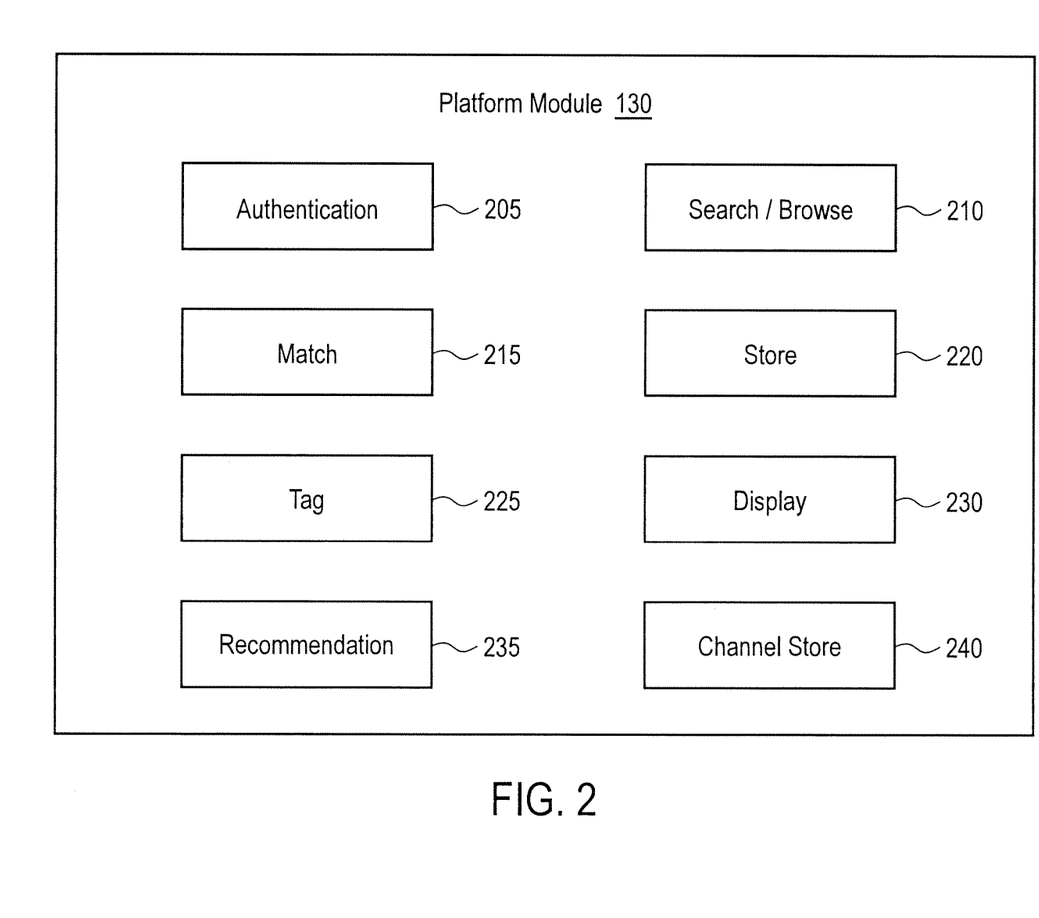
FIG. 2 illustrates server modules utilized in accordance with an embodiment of the invention.

FIG. 2 illustrates a representative platform module 130. In one embodiment, the platform module 130 includes an authentication module 205, a search/browse module 210, a match module 215, a store module 220, a tag module 225, a display module 230, a recommendation module 235 and a channel store module 240.

The authentication module 205 interacts with the client device 150 and authenticates a profile or user account associated with the particular client device 150. For example, the profile includes data associated with a user such as the user name, password, device associations, IP addresses, location, email address, payment information and content subscriptions. In one embodiment, the authentication module 205 recognizes and authenticates the client device associated with a particular user account through password authentication, location authentication, visual authentication or audio authentication. The authentication can be configured to occur when setting up a new client device 150, purchasing content or subscriptions or periodically as needed.

The search/browse module 210 is configured to detect input from a client device 150 and/or the input device 170. In one embodiment, the input represents the selection of a channel, content or application. In another embodiment, the input represents a textual, visual or audible search for content, a channel or application. In yet another embodiment, the input represents browsing content, channels or applications.

The match module 215 coordinates searches and requests for content, channels and applications. For example, the match module 215 identifies relevant content, channels and applications based upon the search criteria. In one embodiment, the match module 215 relies on titles, tags, description and reviews associated with the content, channels and applications to determine relevance of the match.

The store module 220 coordinates the storage of data within the platform server 120. The data coordinated by the store module 220 includes content listings and corresponding descriptions, user profiles, searching and browsing requests, content viewed, channels and applications utilized, tags and friends. Depending on the nature of the data, access to the content is controlled to prevent unauthorized use.

The tag module 225 coordinates the creation and use of tags associated with content, channels and applications. Tags can be assigned to channels and applications by the author of the channels and applications or by users through the client device 150. Tags can also be assigned to portions of audio and video streams by the author of the audio and video streams or by users through the client device 150. The tags may describe the corresponding content or allow an opportunity for a user to provide commentary associated with the corresponding content. The tags can be used for personal use and searched by the user creating the tags or the tags can be aggregated among multiple users and searched through a public database.

The display module 230 coordinates display of representative content and user interfaces from the platform server 120 to each of the client devices 150. Examples of representative content include listings and descriptions of channels, content and applications. The user interface is configured to allow searching and browsing for channels, contents and applications.

Figure 3:
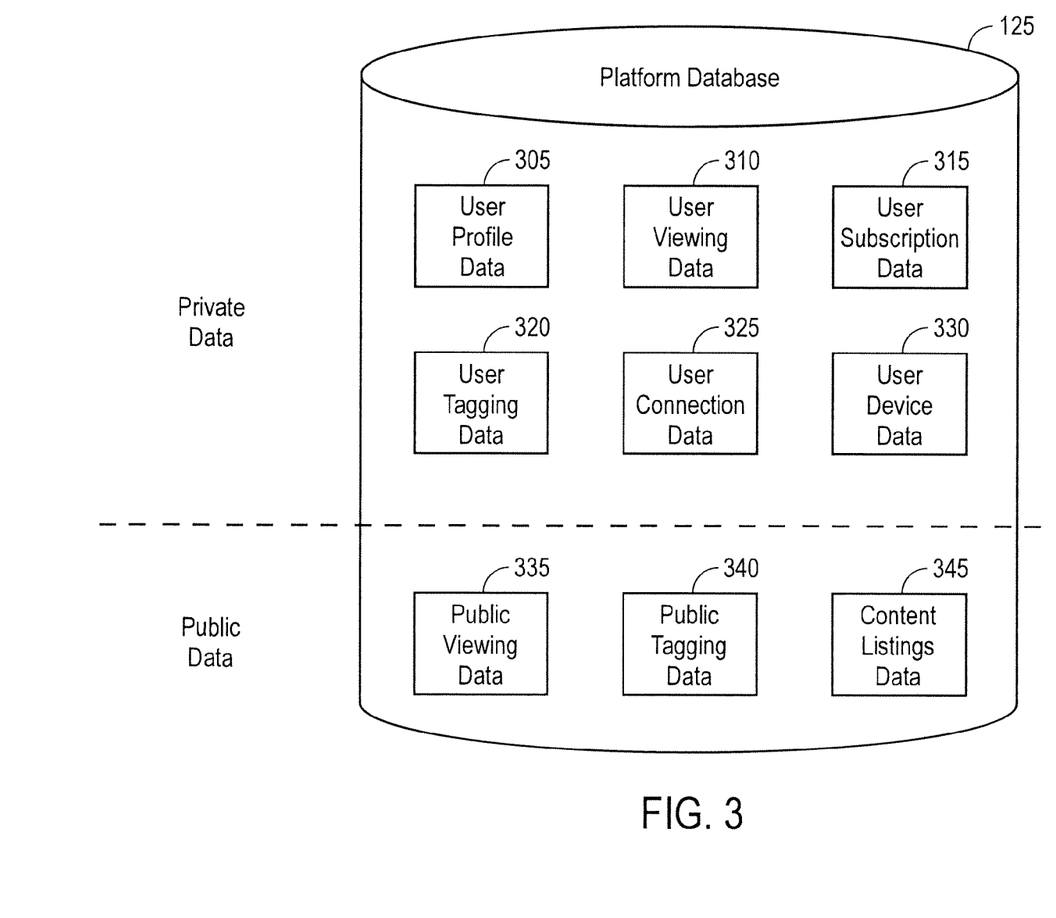
FIG. 3 illustrates server data utilized in accordance with an embodiment of the invention.

The recommendation module 235 is configured to process content recommendations based on a combination of current subscriptions, browsing or searching input and content source. Further, the recommendation module 235 also can utilize tags to provide recommendations. In another embodiment, the recommendation module 235 utilizes the availability of the content to provide a recommendation. For example, a viewing window which describes when the content is available for viewing describes a beginning and end date for the availability of the content. Further, the recommendation module 235 can also utilize the subscription data associated with each user account to determine whether the content is available to the user without additional charge because the account user is already subscribed to the content provider. Further, the recommendation module 235 can also prioritize content that is available free of charge without any subscriptions. In another embodiment, the recommendation module 235 can prioritize content based on popularity ratings as illustrated under the public viewing data 335.

The channel store module 240 is configured to manage subscriptions of channels associated with each client device 150. Channels often contain content such as video content and audio content. In one embodiment, access to the content within a channel requires a subscription to that channel, but the subscription is free. In another embodiment, access to the content within a channel requires a paid subscription. In yet another embodiment, access to some content and applications require payment and a subscription. In one embodiment, the channel store module 240 manages the addition of channels, content and applications. Similarly, the channel store module 240 also manages deletion or modifications to channels, content and applications.

FIG. 3 illustrates a representative platform database 125 as shown in FIG. 1. In one embodiment, the platform database 125 includes private data and public data. The private data contains information which is associated with a particular user; the public data contains information that is aggregated and not associated with a particular user. The private data within the platform database 125 includes user profile data 305, user viewing data 310, user subscription data 315, user tagging data 320, user connection data 325 and user device data 330. The public data within the platform database 125 includes public viewing data 335, public tagging data 340 and content listing data 345.

In one embodiment, utilization of the private data is restricted to access within the platform server 120 and access by the particular user to his or her own private data. Utilization of the public data can be accessed by all users and selected third parties.

The user profile data 305 includes information such as a user's name, address, credit card/payment information, age and gender. The user viewing data 310 includes the channels, audio content, visual content, video content and applications utilized through a client device 150. In one embodiment, the user viewing data 310 allows a client device 150 that is associated with the particular user to view recently watched channels and content as well as determine which applications were recently used. Further, the user viewing data 310 also includes stored searches that are performed through devices associated with this user account. In one embodiment, the stored searches are initiated by explicitly searching for content through a text based, image based or voice based search. In another embodiment, the stored searches are implicitly identified by recording browsing choices.

The user subscription data 315 includes information such as channels subscribed by a particular user and content and applications purchased by the particular user. The user tagging data 320 includes tagging information related to a particular user. For example, the tagging information can include a user's comment or description of a channel, application or content. In one embodiment, the entire content is tagged with a description as determined by the particular user. In another embodiment, a portion of the content is tagged with a description of that portion of the content by the particular user. The user connection data 325 includes a listing of other users that are associated with the particular user as a friend. In one embodiment, having users connected to each other as friends allows a particular user to share recently watched content, channel subscriptions, user tags and applications with other connected users. The user device data 330 includes a listing of devices associated with the particular user. The device includes a client device 150, an input device 170, and a mobile device such as a tablet, laptop computer or smart phone.

The public viewing data 335 includes a listing of channels, content, and applications utilized by many users in aggregate. In one embodiment, the popularity of the content is ranked based on the number of viewers and the order in which the content is viewed. For example, the higher number of views per day for content would indicate higher popularity. Further, when multiple content selections are presented next to each other, the content which is selected first for viewing is given a higher popularity rating.

The public tagging data 340 includes tags that are utilized to describe channels, content and applications from many users in aggregate. In one embodiment, the tagging data within the public tagging data 340 comes from content providers. For example, a movie studio responsible for producing a movie could provide tagging data to the public tagging data 340 that describes portions of the movie. The public tagging data also includes closed captioning and subtitles associated with respective segments of the content.

The content listings data 345 includes listings of content and descriptions of the corresponding content. In one embodiment, the descriptions include key word tagging throughout the content, a summary description of the content, directors and actors associated with the content and third party reviews associated with the content.

Figure 4:
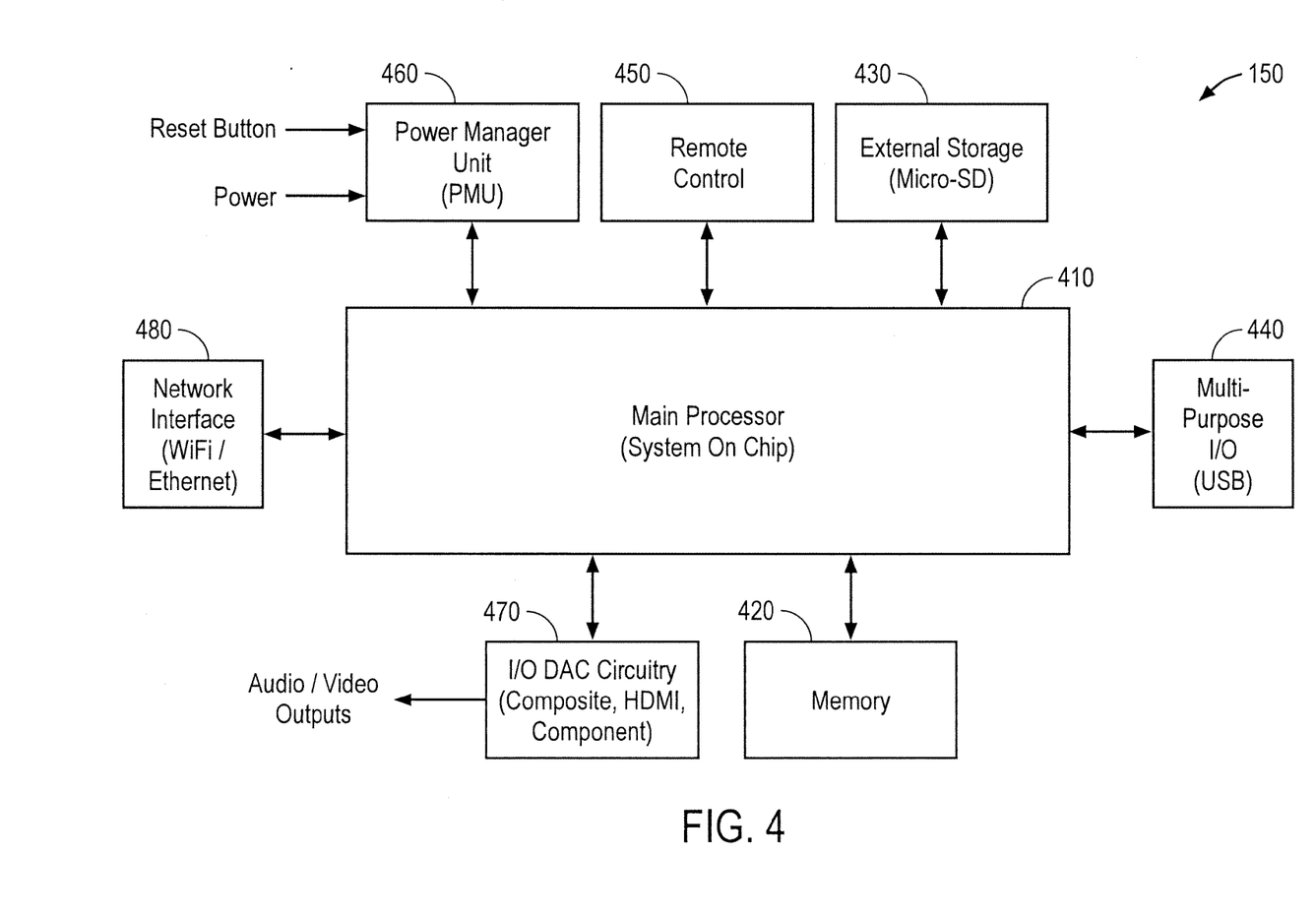
FIG. 4 illustrates a streaming media client device configured in accordance with an embodiment of the invention.

FIG. 4 illustrates a block diagram of a representative client device 150 as shown in FIG. 1. In one embodiment, the client device 150 is configured to receive streamed content. The content streamed into the client device 150 includes audio content, visual content and applications. In one embodiment, the client device 150 is utilized to transmit instructions and selection to the content server 135 and/or the platform server 120.

In one embodiment, the client device includes a processor 410, internal memory 420, external storage 430, multipurpose I/O port 440, input device interface 450, power management 460, audio/visual I/O interface 470 and network interface 480.

In one embodiment, the processor 410 utilizes a central processing unit (CPU). In another embodiment, the processor 410 also utilizes a graphics processing unit (GPU) which may be integrated with the CPU or be configured to be physically separate. In one embodiment, the internal memory 420 includes one of or a combination of random access memory (RAM), flash memory and read only memory (ROM). Additional memory and memory interfaces such as the multi-purpose I/O port 440 may be provided in various embodiments, to support memories such as the external storage 430 which can include hard disks, USB drives, SD cards, and the like. These memories may also be used for storage of applications, programs, buffered media, media, executable computer code and software keys.

In one embodiment, the input device interface 450 enables an input device to interface with the client device 150. In one embodiment, the input device interface 450 is configured to communicate with the input device through a wireless interface such as Bluetooth (BT), radio frequency (RF), and infrared (IR). In one embodiment, the input device interface 450 supports the functionality through a input device including any combination of virtual buttons embodied on a customization screen, physical buttons, accelerometer, gyroscope, pressure sensor, tilt sensor, magnetic sensor, microphone and light sensor.

In one embodiment, the I/O interface 470 supports multiple video output options such as High Definition Multimedia Interface (HDMI), Red-Green-Blue (RGB) component video, Separate Video (S-video), Digital Visual Interface (DVI), Video Graphics Array (VGA), Mobile High-Definition Link (MHL) and composite video. In one embodiment, USB and Apple® Thunderbolt® enabled displays are also supported.

In one embodiment, the network interface 480 supports multiple network interfaces such as Ethernet, Wi-Fi and Bluetooth. In another embodiment, the network interface 480 also supports coaxial, digital TV antenna and satellite television.

FIGS. 5A, 5B, 6A, and 6B, illustrate screen shots showing exemplary embodiments for use with the streaming environment 110 and the platform server 120. The representations within the screen shots are shown only for illustrative purposes. For example, contents within the screen shots may be omitted or added without limiting the scope of the claims.

Figure 5A:
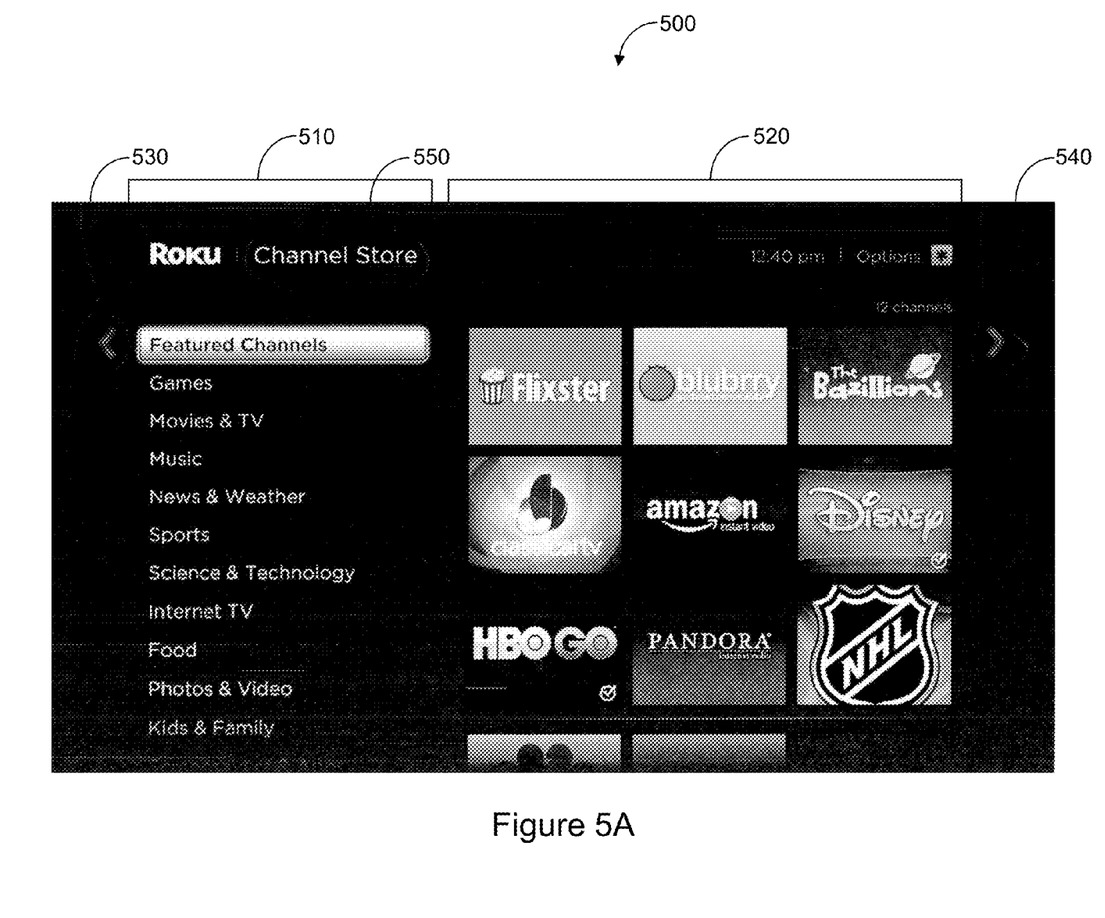

FIG. 5A illustrates an exemplary screen shot 500 depicting a user interface for browsing for content through a client device 150. In one embodiment, the screen shot 500 is an exemplary home screen configured to browse for content through the client device 150; the home screen is transmitted from the platform server 120. The screen shot 500 includes a left panel 510, a right panel 520, a left panel indicator 530, a right panel indicator 540, and a screen title 550.

In this embodiment, the left panel 510 includes a listing of options including featured channels, games, movies and TV, music, news and weather, and sports. More or fewer listings may be shown in other embodiments. Further in this embodiment, the right panel 520 displays different channels, such as Flixster and others. In this embodiment, the channels are displayed in the right panel 520 responsive to a highlighted and selected "featured channels" as shown in the left panel 510. In other embodiments, different content within the right panel 520 would be shown if a different selection was made in the left panel 510. In one embodiment, the screen title 550 displays "channel store" which describes the screen shot 500 including the left panel 510 and the right panel 520.

In one embodiment, the left panel indicator 530 indicates that there is another panel further left of the left panel 510 which is outside of the screenshot 500. Similarly, the right panel indicator 540 indicates that there is another panel further right of the right panel 520 which is outside of the screen shot 500. Depending on the content within the left panel 510, there may or may not be a panel further left of the left panel 510. Accordingly, the left panel indicator 530 may not be present in other embodiments. Depending on the content within the right panel 520, there may or may not be a panel further right of the right panel 520. Accordingly, the right panel indicator 540 may not be present in other embodiments.

In one embodiment, the content within the right panel 520 dynamically changes based on the specific highlight of the content on the left panel 510. For example, the "featured channels" is highlighted within the left panel 510 and the content within the right panel 520 corresponds with the "featured channels". In one embodiment, selection of one of the items within the left panel 510 causes the right panel 520 along with the associated content to slide to the left thus replacing the left panel 510 and exposing another panel that is to the right of the right panel 520.

Figure 5B:
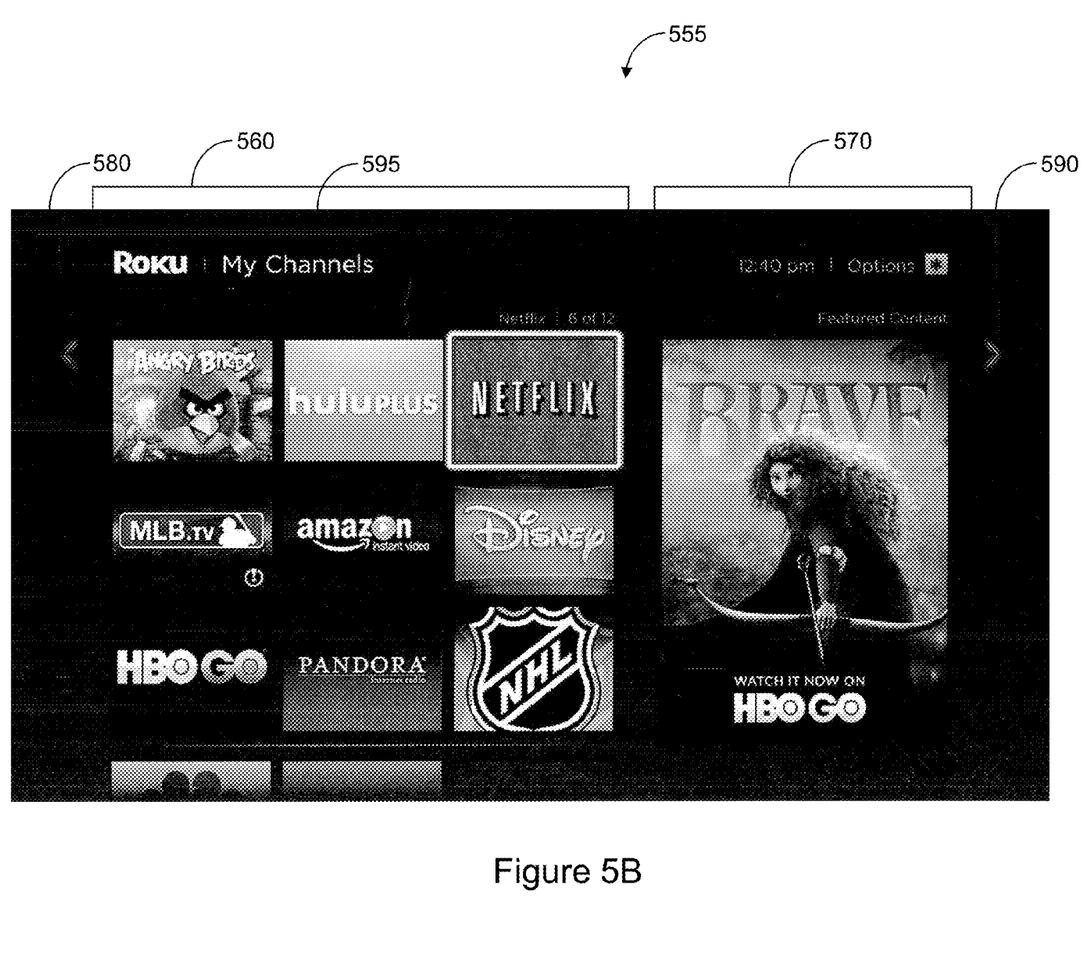

FIG. 5B illustrates an exemplary screen shot 550 depicting a user interface for browsing for content through a client device 150. In one embodiment, the screen shot 550 is an exemplary home screen configured to browse for content through the client device 150; the home screen is transmitted from the platform server 120. The screen shot 550 includes a left panel 560, a right panel 570, a left panel indicator 580, a right panel indicator 590, and a screen title 595.

In this embodiment, the left panel 560 includes a listing of channels. In this embodiment, the listed channels refer to channels belonging to a user. In this embodiment, the right panel 570 displays content associated with the selected channel shown on the left panel 560. In one embodiment, the screen title 595 displays "my channels" which describes the screen shot 550 including the left panel 560 and the right panel 570.

In one embodiment, another panel (now shown) to the left of the left panel 560 displays multiple choices including Featured Channels and My Channels. If "my channels" was selected, then the left panel 560 would display channels that would be responsive to the selection of "my channels". In this embodiment, the left panel 560 is in the current position after the selection of "my channels" which would have been positioned in the current location of the left panel 560.

Figure 6A:
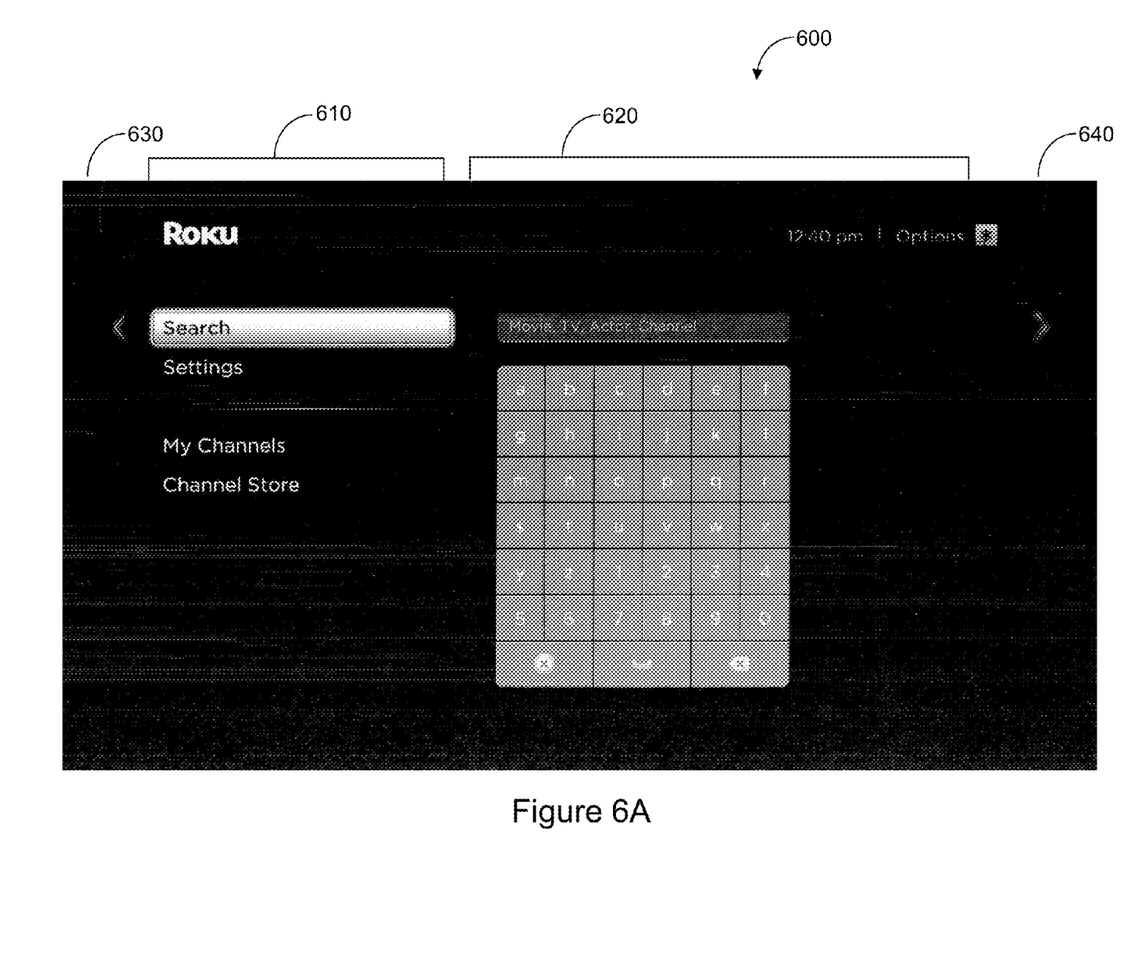

FIG. 6A illustrates an exemplary screen shot 600 depicting a user interface for browsing for content through a client device 150. In one embodiment, the screen shot 600 is an exemplary home screen configured to browse for content through the client device 150; the home screen is transmitted from the platform server 120. The screen shot 600 includes a left panel 610, a central panel 620, a left panel indicator 630, and a right panel indicator 640.

In this embodiment, the left panel 610 includes a listing of options including search, settings, my channels and channel store. More or fewer listings may be shown in other embodiments. In one embodiment, the central panel 620 which is located to the right of the left panel 610 is capable of displaying different content based on the selection of the highlighted selection in the left panel 610. In this embodiment, the search function is highlighted and selected within the left panel 610, and the central panel 620 displays a search input interface. In another embodiment, if the settings were selected and highlighted within the left panel 610, then the user interface and content related to settings would be displayed within the central panel 620.

In one embodiment, the left panel indicator 630 indicates that there is another panel further left of the left panel 610, which is outside of the screen shot 600. Similarly, the right panel indicator 640 indicates that there is another panel further right of the central panel 620, which is outside of the screen shot 600. Depending on the content within the left panel 610, there may or may not be a panel further left of the left panel 610. Accordingly, the left panel indicator 630 may not be present in other embodiments. Depending on the content within the central panel 620, there may or may not be a panel further right of the central panel 620. Accordingly, the right panel indicator 640 may not be present in other embodiments.

Figure 6B:
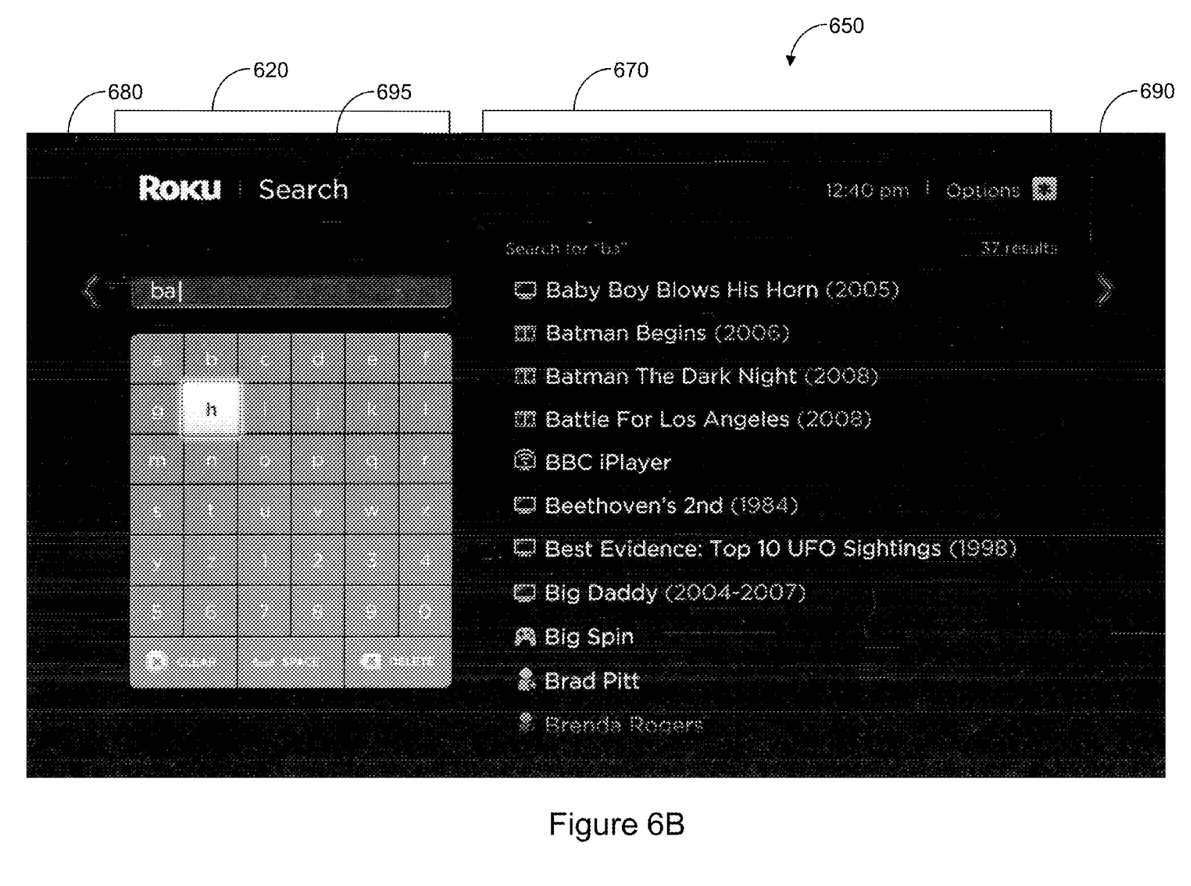

FIG. 6B illustrates an exemplary screen shot 650 depicting a user interface for browsing for content through a client device 150. In one embodiment, the screen shot 650 is an exemplary search screen configured to browse for content through the client device 150; the search screen is transmitted from the platform server 120. The screen shot 650 includes a central panel 620, a right panel 670, a left panel indicator 680, and a right panel indicator 690.

In one embodiment, the central panel 620 in FIG. 6B includes the search user interface as also shown as the central panel 620 in FIG. 6A. Further, the right panel 670 includes search results which are responsive to the search requests entered in the search user interface shown within the central panel 620.

In FIG. 6B, the central panel 620 is positioned on the left side of the screen shot 650. In use, the central panel 620 displayed within the screen shot 650 follows the central panel 620 which was positioned on the right side of the screen shot 600 in FIG. 6A. In FIG. 6B, the search user interface within the central panel 620 allows the user to enter search terms. The central panel 620 within FIG. 6B differs from the central panel 620 within FIG. 6A, where the central panel 620 of FIG. 6A is configured to demonstrate an exemplary user interface.

In use, the central panel 620 slides from the right position within the screen shot 600 to the left position within the screen shot 650 as the search function is selected within the screen shot 600. Additional content is revealed within the right panel 670 as the central panel 620 slides to the left position within the screen shot 650.

Figure 7:
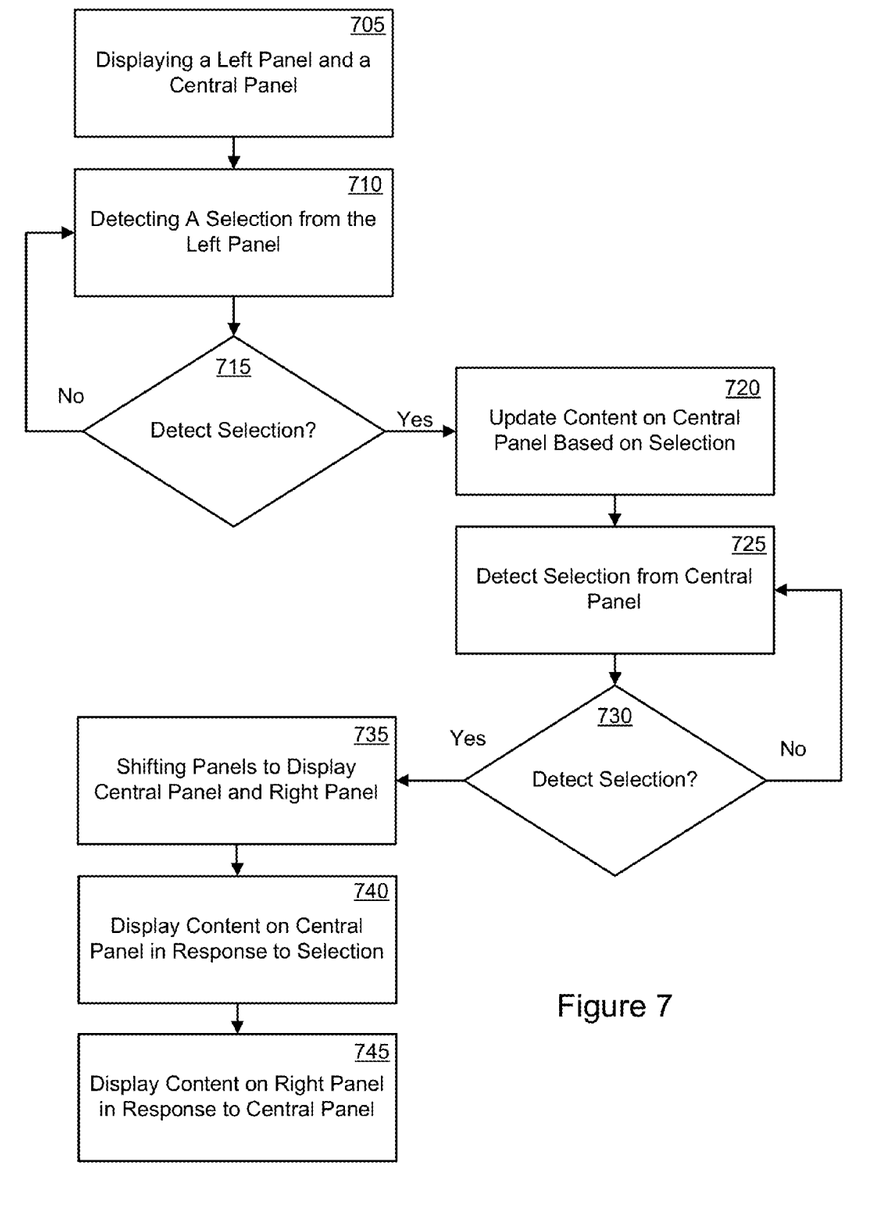
FIG. 7 illustrates processing operations associated with an embodiment of the invention.

FIG. 7 illustrates a flow diagram showing exemplary embodiments for use with the streaming environment 110 and the platform server 120. The blocks within the flow diagrams are shown only for illustrative purposes. For example, blocks within the flow diagram can be further divided, combined or performed in a different order without limiting the scope of the claims.

FIG. 7 illustrates a content browsing method through a client device 150 or input device 170 while leveraging the platform server 120. In Block 705, a left panel and central panel are displayed. In one embodiment, the left panel corresponds with the left panel 610 in FIG. 6A, and the central panel corresponds with the central panel 620 in FIGS. 6A and 6B. In one embodiment, the left and central panels are displayed simultaneously on a visual display device through the client device 150.

In Block 710, detection of a selection from the left panel is detected. If a selection from the left panel is detected within the Block 715, then the content displayed within the central panel is updated based on the selection from the left panel in Block 720. For example, the central panel 620 within FIG. 6A shows a search user interface based on the search function highlighted or selected within the left panel 610 shown within FIG. 6A.

In Block 725, detection of a selection from the central panel is detected. If a selection from the central panel is detected within the Block 730, then the central panel slides to the left and the right panel slides into the display to the right of the central panel within Block 735. For example, the central panel 620 within FIG. 6A shown in the right side position shifts to the left side position within FIG. 6B. The right panel 670 slides into position to the right of the central panel 620 within FIG. 6B.

In Block 740, the content on the central panel is displayed in response to the selection detected within the Block 730. In one embodiment, the central panel 620 within the FIG. 6B is updated to show the search user interface. In Block 745, the content on the right panel is displayed in response to the selections on the central panel. In one embodiment, the content within the right panel 670 as shown in FIG. 6B dynamically changes based on selections within the central panel 620 in FIG. 6B. In this embodiment, the content within the right panel 670 dynamically displays search results based on the letters entered within the central panel 620 in FIG. 6B.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. A method implemented by a computer, comprising:
   aggregating, at a server, content listings and corresponding descriptive data for on-demand content associated with a plurality of content sources, wherein the corresponding descriptive data includes viewing data, paid subscription information, and tagging data associated with a user, wherein each of the plurality of content sources separately stores and manages the on-demand content associated with the content source, and wherein the server stores a respective network address for each of the plurality of content sources;
   analyzing, at the server, the aggregated content listings and corresponding descriptive data to generate a plurality of options associated with the on-demand content, wherein the plurality of options are generated at least based on the viewing data, the paid subscription information, and the tagging data associated with the user, wherein the on-demand content associated with the plurality of options are prioritized based on the paid subscription information, and wherein the plurality of options include a featured content option;
   creating, at the server, a first interface panel including the plurality of options associated with the on-demand content, a screen title located above the plurality of options, and a preview of the on-demand content associated with one of the plurality of options, the preview of on-demand content located to the right of the plurality of options;
   sending the first interface panel to a client device associated with the user for presentation on an associated first display, wherein the client device is a streaming media player coupled to a separate input device having a second display;
   displaying the plurality of options of the first interface panel, the screen title, and the preview of the on-demand content on the associated first display;
   displaying the plurality of options of the first interface panel on the second display;
   receiving, at the server, a first selection from the plurality of options;
   creating, at the server, a second interface panel including a plurality of content based on the first selection and a left panel indicator enabling access to the plurality of options of the first interface panel, wherein the plurality of content is from at least two of the plurality of content sources, and wherein the respective network addresses for the at least two of the plurality of content sources are embedded in the second interface panel;
   sending the second interface panel to the client device for presentation on the associated first display;
   displaying the plurality of content of the second interface panel on the associated first display, wherein the first interface panel is replaced by the second interface panel on the associated first display; and
   displaying additional information associated with the plurality of content of the second interface panel on the second display.

2. The method of claim 1, further comprising sliding the first panel and the second panel into and out of visibility on the associated first display, wherein two panels are displayed simultaneously and any two displayed panels include a previously viewed panel and a related panel based upon a selection in the previously viewed panel.

3. The method of claim 1, further comprising facilitating vertical scrolling through the panels.

4. The method of claim 1, further comprising:
receiving, at the server, a search selection;
creating, at the server, a third panel including an alpha-numeric keyboard in response to the search selection;
sending the third panel to the client device for presentation on the associated first display;
receiving, at the server, inputs from the alpha-numeric keypad; and
sending to the client device matches to the inputs for presentation on the associated first display.

5. The method of claim 1, further comprising:
determining, at the server, a plurality of recommended content based on the first selection, wherein the determining further comprises prioritizing content to be included in the recommended content based on whether the content is subscribed to or purchased by a user that is associated with the client device;
creating, at the server, a third panel including the plurality of recommended content; and
sending the third panel to the client device for presentation on the associated first display.

6. The method of claim 1, wherein the plurality of options comprise at least one of content categories and search keywords.

7. The method of claim 6, wherein the content categories include featured channels, games, movies and TV, music, news and weather, and sports.

8. The method of claim 1, wherein the descriptive data includes content listings data, public viewing data, and public tagging data.

9. The method of claim 1, wherein the aggregating further comprises storing the content listings and corresponding descriptive data in a storage device.

10. The method of claim 1, wherein the on-demand content associated with the plurality of content sources consists of software applications.

11. The method of claim 1, wherein the user is authenticated with the client device by audio authentication via a microphone on the separate input device.

12. The method of claim 1, wherein the separate input device uses a combination of an infrared signal, a radio frequency signal, and a Bluetooth signal to communicate with the client device.

13. The method of claim 1, wherein the client device includes a single multi-purpose input/output port supporting High Definition Multimedia Interface (HDMI), Red-Green-Blue (RGB) component video, Separate Video (S-video), Digital Visual Interface (DVI), Video Graphics Array (VGA), Mobile High-Definition Link (MHL), and composite video.

14. A method implemented by a computer, comprising:
aggregating, at a server, content listings and corresponding descriptive data for on-demand content associated with a plurality of content sources, wherein the corresponding descriptive data includes viewing data, paid subscription information, and tagging data associated with a user, wherein each of the plurality of content sources separately stores and manages the on-demand content associated with the content source, and wherein the server stores a respective network address for each of the plurality of content sources;
analyzing, at the server, the aggregated content listings and corresponding descriptive data to generate a plurality of options associated with the on-demand content, wherein the plurality of options are generated at least based on the viewing data, the paid subscription information, and the tagging data associated with the user, wherein the on-demand content associated with the plurality of options are prioritized based on the paid subscription information, and wherein the plurality of options include a featured content option;
creating, at the server, a first interface panel, a second interface panel, and a title interface panel, wherein the first interface panel includes the plurality of options associated with the on-demand content, wherein the second interface panel includes a preview of the on-demand content associated with one of the plurality of options, and wherein the title interface panel includes a screen title;
sending the first interface panel, the second interface panel, and the title interface panel to a client device associated with the user for presentation on an associated first display, wherein the client device is a streaming media player coupled to a separate input device having a second display;
displaying the first interface panel, the second interface panel, and the title interface panel on the associated first display, wherein the first interface panel is located to the left of the second interface panel, and wherein the title interface panel is located above the first interface panel and the second interface panel;
displaying the plurality of options of the first interface panel on the second display,
receiving, at the server, a selection from the plurality of options;
creating, at the server, a third interface panel in response to the selection, wherein the third panel includes a plurality of content from at least two of the plurality of content sources and a left panel indicator enabling access to the plurality of options of the first interface panel, wherein the respective network addresses for the at least two of the plurality of content sources are embedded in the third interface panel;
sending the third interface panel to the client device for presentation on the associated first display;
displaying the third interface panel on the associated first display, wherein the first interface panel is removed from the associated first display, and wherein the third interface panel is located to the right of the second interface panel on the associated first display;
displaying additional information associated with the plurality of content of the third interface panel on the second display; and
sending additional panels created at the server to the client device in response to additional selections, wherein two additional panels are presented simultaneously on the associated first display and any two additional panels include a previously viewed panel and a related panel based upon a selection in the previously viewed panel.

15. The method of claim 14, further comprising removing another previously viewed panel on the associated first display to facilitate display of the previously viewed panel and the related panel based upon the selection in the previously viewed panel.

16. The method of claim 14, further comprising:
determining, at the server, a plurality of recommended content based on the selection, wherein the determining further comprises prioritizing content to be included in the recommended content based on whether the content is subscribed to or purchased by a user that is associated with the client device;

creating, at the server, an additional panel including the plurality of recommended content; and sending the additional panel to the client device for presentation on the associated first display.

17. The method of claim 14, wherein the plurality of options comprise at least one of content categories and search keywords.

18. The method of claim 17, wherein the content categories include featured channels, games, movies and TV, music, news and weather, and sports.

19. The method of claim 14, wherein the descriptive data includes content listings data, public viewing data, and public tagging data.

20. The method of claim 14, wherein the aggregating further comprises storing the content listings and corresponding descriptive data in a storage device.

* * * * *